US012583980B2

(12) United States Patent
Lee et al.

(10) Patent No.: US 12,583,980 B2
(45) Date of Patent: Mar. 24, 2026

(54) PREPARATION METHOD OF SUPER ABSORBENT POLYMER

(71) Applicant: LG Chem, Ltd., Seoul (KR)

(72) Inventors: Chang Hun Lee, Daejeon (KR); Jiyoon Jeong, Daejeon (KR); Jung Eun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 660 days.

(21) Appl. No.: 18/005,927

(22) PCT Filed: Oct. 28, 2021

(86) PCT No.: PCT/KR2021/015295

§ 371 (c)(1),
(2) Date: Jan. 18, 2023

(87) PCT Pub. No.: WO2022/092844

PCT Pub. Date: May 5, 2022

(65) Prior Publication Data

US 2023/0323043 A1 Oct. 12, 2023

(30) Foreign Application Priority Data

Oct. 29, 2020 (KR) ........................ 10-2020-0142300
Oct. 27, 2021 (KR) ........................ 10-2021-0144931

(51) Int. Cl.

| | |
|---|---|
| ***C08K 5/1515*** | (2006.01) |
| ***C08J 3/12*** | (2006.01) |
| ***C08J 3/24*** | (2006.01) |
| ***C08K 3/36*** | (2006.01) |
| ***C08K 5/053*** | (2006.01) |
| ***C08K 5/092*** | (2006.01) |
| ***C08K 5/109*** | (2006.01) |

(52) U.S. Cl.

CPC ................. *C08J 3/245* (2013.01); *C08J 3/12* (2013.01); *C08K 3/36* (2013.01); *C08K 5/053* (2013.01); *C08K 5/092* (2013.01); *C08K 5/109* (2013.01); *C08K 5/1515* (2013.01); *C08J 2333/08* (2013.01)

(58) Field of Classification Search

CPC ........................................................ C08J 3/245
See application file for complete search history.

(56) References Cited

U.S. PATENT DOCUMENTS

| | | | |
|---|---|---|---|
| 5,422,405 | A | 6/1995 | Dairoku et al. |
| 5,672,633 | A | 9/1997 | Brehm et al. |
| 5,797,893 | A | 8/1998 | Wada et al. |
| 2006/0276598 | A1 | 12/2006 | Wada et al. |
| 2007/0106013 | A1 | 5/2007 | Adachi et al. |
| 2010/0072421 | A1 | 3/2010 | Kitano et al. |
| 2011/0003926 | A1 | 1/2011 | Nogi et al. |
| 2012/0305842 | A1 | 12/2012 | Torii et al. |
| 2014/0031473 | A1 | 1/2014 | Nogi et al. |
| 2016/0318002 | A1 | 11/2016 | Lee et al. |
| 2018/0044487 | A1 | 2/2018 | Miyajima et al. |
| 2018/0105655 | A1 | 4/2018 | Matsubara et al. |
| 2018/0265653 | A1 | 9/2018 | Lee et al. |
| 2019/0308171 | A1 | 10/2019 | Kim et al. |
| 2019/0344242 | A1 | 11/2019 | Kim et al. |
| 2020/0009529 | A1 | 1/2020 | Nam et al. |
| 2020/0197909 | A1 | 6/2020 | Hwang et al. |
| 2021/0322953 | A1 | 10/2021 | Park et al. |
| 2022/0266221 | A1 | 8/2022 | Lee et al. |

FOREIGN PATENT DOCUMENTS

| | | | |
|---|---|---|---|
| CA | 2403966 | A1 | 9/2002 |
| CN | 1784430 | A | 6/2006 |
| CN | 101627086 | A | 1/2010 |
| CN | 103459473 | A | 12/2013 |
| CN | 107614575 | A | 1/2018 |
| CN | 109312082 | A | 2/2019 |
| CN | 110312755 | A | 10/2019 |
| EP | 0493011 | A2 | 7/1992 |
| EP | 0605150 | A1 | 7/1994 |
| EP | 0761241 | A2 | 3/1997 |
| EP | 0789047 | A1 | 8/1997 |
| EP | 3056268 | A1 | 8/2016 |
| EP | 3101038 | A1 | 12/2016 |
| EP | 3269757 | A1 | 1/2018 |
| EP | 3269758 | A1 | 1/2018 |
| EP | 3375810 | A1 | 9/2018 |

(Continued)

OTHER PUBLICATIONS

International Search Report for Application No. PCT/KR2021/015295 mailed Feb. 3, 2022, pp. 1-4.
Odian, G. "Principles of Polymerization" Dec. 1981, p. 203, John Wiley & Sons, Inc.
Schwalm, R. "UV Coatings: Basics, Recent Developments and New Applications," Dec. 2006, p. 115, Elsevier.
Search Report dated Dec. 13, 2024 from the Office Action for Chinese Application No. 202180013254.5 Issued Dec. 23, 2024, pp. 1-3.

(Continued)

*Primary Examiner* — Vickey Nerangis
(74) *Attorney, Agent, or Firm* — Lerner David LLP

(57) ABSTRACT

Provided is a method for preparing superabsorbent polymer, which includes conducting first surface crosslinking of a base resin powder while raising the temperature to a first temperature, in the presence of a first surface crosslinking agent; conducting second surface crosslinking of the first surface crosslinked base resin powder at a second temperature. According to the method of the present technology, surface crosslinking strength of the resulting superabsorbent polymer is increased, thus enabling preparation of superabsorbent polymer having little or no decline in absorbency under load even after anti-caking agent treatment.

13 Claims, No Drawings

(56) References Cited

FOREIGN PATENT DOCUMENTS

| | | | | | |
|---|---|---|---|---|---|
| EP | 3424988 | A1 | | 1/2019 | |
| EP | 3543281 | A1 | * | 9/2019 | .............. C08J 3/245 |
| EP | 3819329 | A1 | | 5/2021 | |
| JP | H09124879 | A | | 5/1997 | |
| JP | H10244151 | A | | 9/1998 | |
| JP | H10265582 | A | | 10/1998 | |
| JP | 2000093792 | A | | 4/2000 | |
| JP | 3494401 | B2 | | 2/2004 | |
| JP | 5323053 | B2 | | 10/2013 | |
| JP | 5558096 | B2 | | 7/2014 | |
| JP | 2015120933 | A | | 7/2015 | |
| JP | 2020-125472 | A | | 8/2020 | |
| KR | 100336706 | B1 | | 12/2002 | |
| KR | 20060009316 | A | | 1/2006 | |
| KR | 20100048450 | A | | 5/2010 | |
| KR | 20170033634 | A | | 3/2017 | |
| KR | 101752384 | B1 | | 6/2017 | |
| KR | 20170127496 | A | | 11/2017 | |
| KR | 102077816 | B1 | | 2/2020 | |
| WO | 2004113452 | A1 | | 12/2004 | |
| WO | 2007116777 | A1 | | 10/2007 | |
| WO | 2008108277 | A1 | | 9/2008 | |
| WO | 2012102407 | A1 | | 8/2012 | |
| WO | 2014021388 | A1 | | 2/2014 | |
| WO | 2016085123 | A1 | | 6/2016 | |
| WO | 2016143739 | A1 | | 9/2016 | |
| WO | 2018147317 | A1 | | 8/2018 | |
| WO | 2020111421 | A1 | | 6/2020 | |
| WO | 2020122390 | A1 | | 6/2020 | |

OTHER PUBLICATIONS

Notice of Opposition for European Application No. 21886838.8, dated Feb. 14, 2025, pp. 1-8. [See pp. 4-5, categorizing the cited references].

Buchholz, F. et al., "Modern Superabsorbent Polymer Technology" Wiley-Vch, John Wiley & Sons, Inc., Copyright © !998, pp. 1-29.

Third Party of Observation for PCT /KR2021/015295 dated Feb. 20, 2023. 12 pgs.

* cited by examiner

PREPARATION METHOD OF SUPER ABSORBENT POLYMER

TECHNICAL FIELD

Cross-Reference to Related Application(S)

The present application is a national phase entry under 35 U.S.C. § 371 of International Application No. PCT/KR2021/015295, filed on Oct. 28, 2021, which claim priority from Korean Patent Application No. 10-2020-0142300, filed on Oct. 29, 2020, and Korean Patent Application No. 10-2021-0144931, filed on Oct. 27, 2021, the disclosures of which are herein incorporated by reference in their entirety.

TECHNICAL FIELD

This disclosure relates to a method for preparing superabsorbent polymer.

BACKGROUND ART

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as water-holding material for soil, water stop material for civil engineering and architecture, sheets for raising seedling, freshness preservatives in the field of food circulation, fomentation material, etc., is mainly used in the field of hygienic goods such as a disposable diaper, sanitary pad, and the like.

With the worldwide trend towards thin diapers, the rate of pulp constituting the absorption core of a diaper is decreasing, and the rate of superabsorbent polymer is increasing.

As the rate of superabsorbent polymer in a diaper increases, the importance of the properties of SAP is increasing. Particularly, the importance of absorbency under load and penetration under load, influencing rewet or absorption speed of a diaper under load, is increasing.

Since superabsorbent polymer is water-absorbing polymer, caking is generated in high humidity regions, and in order to prevent such a phenomenon, an anti-caking agent is added. As the anti-caking agent, inorganic substances that do not absorb water are generally used. Since inorganic substance prevents blocking between SAP particles, it is also used as additive for improving penetration.

However, the inorganic substance increases surface friction during swelling of superabsorbent polymer, and impedes swelling under pressure condition, thus causing deterioration of absorbency under load.

DETAILED DESCRIPTION OF THE INVENTION

Technical Problem

It is an object of the present technology to provide superabsorbent polymer having little or no decline in absorbency under load even after anti-caking agent treatment, by increasing surface crosslinking strength of superabsorbent polymer.

Technical Solution

According to one embodiment of the invention, there is provided a method for preparing superabsorbent polymer comprising steps of: conducting crosslinking polymerization of water soluble ethylenically unsaturated monomers having acid groups of which at least a part are neutralized, in the presence of a polymerization initiator and an internal crosslinking agent, to form hydrogel polymer comprising crosslinked polymer of the water soluble ethylenically unsaturated monomers; drying, grinding and classifying the hydrogel polymer to obtain base resin powder; conducting first surface crosslinking of the base resin powder while raising the temperature to a first temperature, in the presence of a first surface crosslinking agent; conducting second surface crosslinking of the first surface crosslinked base resin powder at a second temperature, in the presence of a second surface crosslinking agent, to form superabsorbent polymer particles, wherein the first temperature is 180° C. or more, and the second temperature is 120° C. to 150° C., and the second surface crosslinking agent comprises an epoxy-based compound having larger weight average molecular weight than that of the first surface crosslinking agent, and capable of forming a covalent bond at the second temperature.

According to another embodiment of the invention, there is provided superabsorbent polymer prepared by the above method, comprising base resin powder comprising crosslinked polymer of water soluble ethylenically unsaturated monomers having acid groups of which at least a part are neutralized; and a surface crosslinked layer positioned on the base resin powder, wherein the surface crosslinked layer comprises first crosslinked polymer in which a part of the crosslinked polymer is additionally crosslinked by a first surface crosslinking agent; and second crosslinked polymer in which the remaining crosslinked polymer is additionally crosslinked by a second surface crosslinking agent, the second surface crosslinking agent comprises an epoxy-based compound having large weight average molecular weight than the first surface crosslinking agent, and capable of forming a covalent bond at 120 to 150° C.

The terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

As used herein, the term "polymer" means a polymerized state of water soluble ethylenically unsaturated monomers, and it may include those of all moisture content ranges or particle diameter ranges. Among the polymers, those after polymerized and before dried, and having a moisture content of about 40 wt % or more may be referred to as hydrogel polymer.

And, "base resin" means resin particles or powders that are obtained by drying and grinding the hydrogel polymer, before passing through additional processes, for example, surface crosslinking, fine reassembly, redrying, regrinding, reclassfication, and the like.

And, "superabsorbent polymer" means the polymer or base resin itself, or is used to include the polymer or base resin made suitable for productization through additional processes, for example, surface crosslinking, fine reassembly, drying, grinding, classification, and the like, according to the context.

Hereinafter, a method for preparing superabsorbent polymer and superabsorbent polymer prepared thereby according to specific embodiments of the invention will be explained in detail.

Specifically, a method for preparing superabsorbent polymer according to one embodiment of the invention comprises steps of:

conducting crosslinking polymerization of water soluble ethylenically unsaturated monomers having acid groups of which at least a part are neutralized, in the presence of a polymerization initiator and an internal crosslinking agent, to form hydrogel polymer comprising the crosslinked polymer of water soluble ethylenically unsaturated monomers (step 1);

drying, grinding and classifying the hydrogel polymer to obtain base resin powder (step 2);

conducting first surface crosslinking of the base resin powder while raising the temperature to a first temperature, in the presence of a first surface crosslinking agent (step 3); and conducting second surface crosslinking of the first surface crosslinked base resin powder at a second temperature, in the presence of a second surface crosslinking agent, to form superabsorbent polymer particles (step 4), wherein the first temperature is 180° C. or more, and the second temperature is 120° C. to 150° C., and the second surface crosslinking agent comprises an epoxy-based compound having larger weight average molecular weight than that of the first surface crosslinking agent, and capable of forming a covalent bond at the second temperature.

In general, the wider the surface area of superabsorbent polymer, more rapid the absorption speed. However, due to the limitation in terms of production facilities, if the surface area of superabsorbent polymer is wide, it may be difficult to sufficiently apply a surface crosslinking agent, and thus, absorbency under load of superabsorbent polymer finally prepared may be significantly deteriorated.

Thus, in the present disclosure, when preparing superabsorbent polymer, by progressing a first surface crosslinking reaction of a surface crosslinking agent having small weight average molecular weight at high temperature, the surface crosslinking agent is allowed to penetrate deeply into the surface of superabsorbent polymer, thereby securing absorbency under load of superabsorbent polymer, and thereafter, by progressing a second surface crosslinking reaction using an epoxy-based surface crosslinking agent having larger weight average molecular weight than that the first surface crosslinking agent and capable of forming a covalent bond at an optimum temperature range, deterioration of absorbency under load may be prevented or decreased even after anti-caking treatment. And, the preparation method is particularly effective for the preparation of superabsorbent polymer having wide surface area and high absorption speed.

And, although deterioration of absorbency under load of superabsorbent polymer according to anticaking treatment may be also decreased by the conventional preparation method wherein only first surface crosslinking is conducted, in this case, surface crosslinking reactions should be progressed a lot, and thus, centrifuge retention capacity (CRC) may be significantly deteriorated. Thus, in the present disclosure, by progressing second surface crosslinking of unreacted surface after first surface crosslinking using a surface crosslinking agent having large Mw compared to the first surface crosslinking agent and having a rapid reaction rate even at low temperature, the amount of declination of absorbency under load may be largely reduced to less than 5%, and simultaneously, loss of centrifuge retention capacity may be minimized.

And, during the second surface crosslinking, a surface crosslinking agent having a rapid reaction rate at low temperature is used, and thus, after the first surface crosslinking process is conducted at high temperature of about 180° C., the second surface crosslinking may be progressed by residual heat of the first surface crosslinking in a cooling process without a separate heating process.

Hereinafter, a method for preparing superabsorbent polymer according to one embodiment of the invention will be explained in more detail according to steps.

(Step 1)

In the preparation method according to one embodiment of the invention, the step 1 is a step of preparing hydrogel polymer.

Specifically, the step 1 may be conducted by mixing water soluble ethylenically unsaturated monomers comprising acid groups, of which at least a part are neutralized, a polymerization initiator and an internal crosslinking agent to prepare a monomer composition, and polymerizing the same. For example, the monomer composition may be prepared by introducing a polymerization initiator and an internal crosslinking agent in a neutralized solution of water soluble ethylenically unsaturated monomers having acid groups, and mixing them.

The water soluble ethylenically unsaturated monomers having acid groups of which at least a part are neutralized may be prepared by neutralizing the acid groups of water soluble ethylenically unsaturated monomers using a neutralizing agent.

The water soluble ethylenically unsaturated monomers may be any monomers commonly used in the preparation of superabsorbent polymer. As non-limiting examples, the water soluble ethylenically unsaturated monomer may be a compound represented by the following Chemical Formula 1:

$R_1$—COOM [Chemical Formula 1]

In the Chemical Formula 1, $R_1$ is a C2-5 alkyl group comprising an unsaturated bond, M is a hydrogen atom, a monovalent or divalent metal, an ammonium group or an organic amine salt.

Preferably, the monomers may be one or more selected from the group consisting of methacrylic acid, and monovalent (alkali) metal salts, divalent metal salts, ammonium salts and organic amine salts thereof.

It is favorable that methacrylic acid or a salt thereof is used as the water soluble ethylenically unsaturated monomer, because superabsorbent polymer with improved absorption property can be obtained. In addition, as the monomers, one or more selected from the group consisting of maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methylpropane sulfonic acid, (meth) acrylamide, N-substituted (meth)acrylate, 2-hydroxyethyl (meth)acrylate, 2-hydroxypropyl (meth)acrylate, methoxy polyethylene glycol (meth)acrylate or polyethylene glycol (meth)acrylate, (N,N)-dimethylaminoethyl (meth)acrylate or (N,N)-dimethylaminopropyl (meth)acrylamide may be used.

And, the concentration of the water soluble ethylenically unsaturated monomers in the monomer composition may be appropriately controlled considering polymerization time and reaction conditions, and preferably, it may be 20 to 90 wt %, or 40 to 65 wt %. Such a concentration range may be advantageous for controlling grinding efficiency during grinding of polymer as described below, while obviating a need to remove unreacted monomers after polymerization, using gel phenomenon generated in the polymerization reaction of an aqueous solution of high concentration. However, if the concentration of monomers is too low, yield of superabsorbent polymer may decrease. To the contrary, if the concentration of monomers is too high, a part of monomers may be precipitated or grinding efficiency during grinding of polymerized hydrogel polymer may be lowered, thus causing process problems, and the properties of superabsorbent polymer may be deteriorated.

And, as the neutralizing agent, basic materials, such as sodium hydroxide (or caustic soda), potassium hydroxide, ammonium hydroxide, and the like, capable of neutralizing acid groups, may be used.

The introduction amount of the neutralizing agent and neutralization reaction conditions are not specifically limited, and it may be conducted such that the neutralization degree of water soluble ethylenically unsaturated monomers, which refers to a degree of neutralization of the acid groups included in the water soluble ethylenically unsaturated monomers by the neutralizing agent, may become 50 to 90 mol %, or, 60 to 85 mol %, or 65 to 85 mol %, or 70 to 80 mol %. Although the range of the neutralization degree may vary according to the final properties, if the neutralization degree is too high, neutralized monomers may be precipitated, and thus, it may be difficult to smoothly progress polymerization, and to the contrary, if the neutralization degree is too low, absorption force of polymer may be significantly lowered, and it may exhibit elastic rubber-like properties, which is difficult to handle.

Meanwhile, in the monomer composition, as the polymerization initiator, a thermal polymerization initiators or a photopolymerization initiator according to UV irradiation may be used according to polymerization method. However, even in the case of photopolymerization, since a certain amount of heat is generated by UV irradiation, etc., and heat is generated to some degree according to the progression of an exothermic polymerization reaction, a thermal polymerization initiator may be additionally included.

The photopolymerization initiator may be used without limitations in terms of its constructions, as long as it is a compound capable of forming radicals by light such as UV. As the photopolymerization initiator, one or more selected from the group consisting of benzoin ether, dialkyl acetophenone, hydroxyl alkylketone, phenyl glyoxylate, benzyl dimethyl Ketal, acyl phosphine, and α-aminoketone may be used. Meanwhile, as specific examples of acyl phosphine, diphenyl(2,4,6-trimethylbenzoyl) phosphine oxide, phenylbis(2,4,6-trimethylbenzoyl) phosphine oxide, ethyl (2,4,6-trimethylbenzoyl)phenylphosphinate, and the like may be mentioned. More various photopolymerization initiators are described in Reinhold Schwalm, "UV Coatings: Basics, Recent Developments and New Application (Elsevier 2007)", page 115, and are not limited to the above described examples.

The photopolymerization initiator may be included in the concentration of 0.001 to 5 parts by weight or 0.005 to 4.5 parts by weight, based on 100 parts by weight of the water soluble ethylenically unsaturated monomers. If the concentration of the photopolymerization initiator is too low, polymerization speed may become slow, and if the concentration of the photopolymerization initiator is too high, the molecular weight of superabsorbent polymer may be low and the properties may become non-uniform.

And, as the thermal polymerization initiator, one or more selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate ($(NH_4)_2S_2O_8$), etc., and, specific examples of the azo initiator may include 2,2-azobis (2-amidinopropane) dihydrochloride, 2,2-azobis-(N,N-dimethylene) isobutyramidinedihydrochloride, 2-(carbamoylazo) isobutyronitril, 2,2-azobis [2-(2-imidazolin-2-yl) propane]dihydrochloride, 4,4-azobis-(4-cyanovalericacid), etc. More various thermal initiators are described in "Principle of Polymerization (Wiley, 1981)", Odian, page 203, and are not limited to the above described examples.

The thermal polymerization initiator may be used in the amount of 0.01 to 5 parts by weight, or 0.1 to 4 parts by weight, based on 100 parts by weight of the water soluble ethylenically unsaturated monomers. If the concentration of the thermal polymerization initiator is too low, polymerization speed may become slow, and remaining monomers may be extracted in a large quantity in the final product. And, if the concentration of the thermal polymerization initiator is too high, polymer chains making up the network of superabsorbent polymer may become short, and thus, water soluble content may increase, and absorption under pressure of superabsorbent polymer may be lowered, thereby deteriorating the properties of polymer.

And, the monomer composition comprises an internal crosslinking agent as the raw material of superabsorbent polymer.

As the internal crosslinking agent, any compounds can be used as long as they enable the introduction of crosslinking during polymerization of the water soluble ethylenically unsaturated monomers. As non-limiting examples, as the internal crosslinking agent, multifunctional crosslinking agents such as N,N'-methylenebisacrylamide, trimethylolpropane tri(meth)acrylate, ethyleneglycol di(meth)acrylate, polyethyleneglycol (meth)acrylate, propyleneglycol di(meth)acrylate, polypropyleneglycol (meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propyleneglycol, glycerin, or ethylenecarbonate may be used alone or in combinations, but is not limited thereto.

Among them, considering crosslinking improvement and the resulting excellent improvement of absorption power of superabsorbent polymer, preferably, polyethylene glycol diacrylate may be used, and more specifically, polyethylene glycol diacrylate having weight average molecular weight 300 to 800 g/mol, or 400 to 800 g/mol may be used. The weight average molecular weight (Mw) of polyethylene glycol diacrylate may be measured using gel permeation chromatography, and specific measurement method and measurement conditions are as described below in the measurement method of the weight average molecular weight (Mw) of polycarboxylic acid, except deriving a Mw value using a calibration curve to a polystyrene standard specimen.

Such an internal crosslinking agent may be used in the content of 0.01 to 5 parts by weight, based on 100 parts by weight of the water soluble ethylenically unsaturated monomers. If the concentration of the internal crosslinking agent is too low, absorption speed of polymer may be lowered, and gel strength may be weak. To the contrary, if the concentration of the internal crosslinking agent is too high, absorption force of superabsorbent polymer may be lowered, and it may not be preferable as an absorbent. More specifically, the internal crosslinking agent may be included in the content of 0.1 to 5 parts by weight, or 0.2 to 3 parts by weight.

Meanwhile, as used herein, the term 'internal crosslinking agent' is used to distinguish from a surface crosslinking agent for crosslinking of the surface of base resin as described below, and it performs a function for crosslinking the unsaturated bonds of the above explained water soluble ethylenically unsaturated monomers to polymerize. In this step, crosslinking is progressed without division of the surface or inside, but by the surface crosslinking process of base resin as described below, the surface of the finally prepared superabsorbent polymer consists of a structure crosslinked by a surface crosslinking agent, and the inside consists of a structure crosslinked by the internal crosslinking agent.

In addition, the monomer composition may further comprise additives such as a thickener, a plasticizer, a preservation stabilizer, an antioxidant, etc., as necessary.

And, such a monomer composition may be prepared in the form of a solution in which the above explained raw materials are dissolved in a solvent. Wherein, the solvent that can be used is not limited in terms of its construction as long as it can dissolve or disperse the above explained raw materials, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

The solvent may be included in the remaining amount except the above explained components, based on the total content of the monomer composition.

And, the solid content in the monomer composition of a solution state, namely the concentration of monomers, internal crosslinking agent and polymerization initiator may be appropriately controlled considering polymerization time and reaction conditions. For example, the solid content in the monomer composition may be 10 to 80 wt %, or 15 to 60 wt %, or 20 to 40 wt %. In case the monomer composition has the above range of solid content, it may be advantageous for controlling grinding efficiency during grinding of polymer as described below, while obviating a need to remove unreacted monomers after polymerization, using gel phenomenon generated in the polymerization reaction of an aqueous solution of high concentration.

Meanwhile, a method of thermal polymerization or photopolymerization of such monomer composition to form hydrogel polymer is not specifically limited in terms of its constructions, as long as it is a commonly used polymerization method.

Specifically, the polymerization method is largely classified into thermal polymerization and photopolymerization according to energy source, and it may be conducted by one of thermal polymerization and photopolymerization, or both thermal polymerization and photopolymerization may be conducted. Wherein, the sequence of thermal polymerization and photopolymerization is not specifically limited, and thermal polymerization may be conducted after photopolymerization, or photopolymerization may be conducted after thermal polymerization, or photopolymerization and thermal polymerization may be simultaneously conducted. Commonly, thermal polymerization may be progressed in a reactor equipped with a stirring axis such as a kneader, and photopolymerization may be progressed in a reactor equipped with a movable conveyer belt, but the above explained polymerization method is no more than one example, and the invention is not limited thereto.

For example, hydrogel polymer may be obtained by introducing the above described monomer composition into a reactor equipped with a stirring axis such as a kneader, and supplying hot air or heating the reactor to progress thermal polymerization. Wherein, the hydrogel polymer discharged to the outlet of the reactor may be in the size of a few centimeters to a few millimeters according to the shape of the stirring axis equipped in the reactor. Specifically, the size of obtained hydrogel polymer may vary according to the concentration of the introduced monomer composition and the introduction speed, etc., and commonly, hydrogel polymer with particle diameter of 2 to 50 mm may be obtained.

And, in case photopolymerization of the monomer composition is progressed in a reactor equipped with a movable conveyer belt as explained above, hydrogel polymer obtained may be commonly a hydrogel polymer sheet having a width of the belt. Wherein, the thickness of the sheet may vary according to the concentration of the introduced monomer composition and the introduction speed, but it is preferable that the monomer composition is supplied so as to obtain a polymer sheet with a thickness of about to 0.5 to about 5 cm. In case the monomer composition is fed such that the thickness of a polymer sheet may become too thin, production efficiency may be low, and if the thickness of a polymer sheet is greater than 5 cm, due to too thick thickness, polymerization may not uniformly occur over the entire thickness.

The moisture content of hydrogel polymer thus obtained may be commonly 40 to 80 wt %. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. Wherein, the temperature is raised from room temperature to about 180° C. and then maintained at 180° C., and the total drying time is 20 minutes including a temperature raising step of 5 minutes.

According to one embodiment of the invention, a coarse grinding process of the above obtained hydrogel polymer may be optionally further conducted.

Wherein, grinders that can be used in the coarse grinding process are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but is not limited thereto.

Wherein, the coarse grinding may be conducted such that the particle diameter of hydrogel polymer may become about 2 to 20 mm. Coarse grinding to a particle diameter less than 2 mm would not be technologically easy due to the high moisture content of hydrogel polymer, and may cause agglomeration between ground particles. Meanwhile, if coarse ground to a particle diameter greater than 20 mm, the effect of increasing the efficiency of a drying step conducted later may be insignificant.

(Step 2)

Next, the step 2 is a step of drying, grinding and classifying the hydrogel polymer prepared in the step 1 to prepare base resin.

The drying process of the hydrogel polymer may be conducted at 50 to 250° C. If the drying temperature is less than 50° C., drying time may too lengthen, and the properties of the finally prepared superabsorbent polymer may be deteriorated, and if the drying temperature is greater than 250° C., only the surface of polymer may be dried, and thus, fines may be generated in the grinding process conducted later, and the properties of the finally prepared superabsorbent polymer may be deteriorated. More preferably, the drying may be progressed at a temperature of 150 to 200° C., even more preferably at a temperature of 160 to 190° C. Meanwhile, the drying may be progressed for 20 minutes to 15 hours considering process efficiency, but the drying time is not limited thereto.

And, the drying method is not limited as long as it is commonly used for a drying process of hydrogel polymer. Specifically, the drying may be progressed by hot air supply, infrared irradiation, microwave irradiation or UV irradiation, and the like.

The moisture content of polymer dried after the drying step may be 5 wt % or less, more specifically 0.1 to 3 wt %. If the moisture content of dried polymer is greater than 5 wt %, undried polymer may be obtained.

Subsequently, the dried polymer is ground and classified.

The polymer powder obtained after the grinding may have a particle diameter of 150 to 850 μm. As a grinder used to grind to such a particle diameter, specifically, a ball mill, a pin mill, a hammer mill, a screw mill, a roll mill, a disc mill or a jog mill, and the like may be used, but is not limited thereto.

And, in order to manage the properties of superabsorbent polymer powder finally productized after the grinding step, a separate process of classifying polymer powder obtained after grinding according to particle diameter may be conducted. Preferably, polymers having particle diameter of 150 to 850 (may be classified, and only the polymer powders having such particle diameters may be subjected to a surface crosslinking step as described below, and productized.

It is appropriate that the base resin powder obtained through the above processes may be prepared and provided with particle diameter of 150 to 850 μm. More specifically, at least 95 wt % or more of the base resin powders may have particle diameters of 150 to 850 μm, and the content of fines having particle diameters less than 150 μm may be less than 3 wt %. As such, since the particle diameter distribution of base resin powders is controlled within a preferable range, the finally prepared superabsorbent polymer may better exhibit the above explained properties.

Unless otherwise mentioned herein, a "particle diameter" or "particle size" may be measured by standard sieve analysis or laser diffraction method, preferably standard sieve analysis, and an "average particle diameter" or "weight average particle diameter" may mean particle diameter (D50) constituting 50% of weight percentage in the particle size distribution curve obtained through laser diffraction method.

Meanwhile, fine particles below a certain particle size, namely having a particle size less than about 150 μm are referred to base resin fines, superabsorbent polymer fines, SAP fines or fines (fine powder), and particles having particle diameters of 150 to 850 μm are referred to as normal particles.

The fines may be generated during the polymerization process, drying process, or grinding process of dried polymer, but in case fines are included in the final product, it may be difficult to handle, and gel blocking may be generated, thus deteriorating the properties. Thus, it is preferable to reassemble such that fines may not be included in the final polymer product or fines may become normal particles.

For example, a reassembling process wherein the fines are agglomerated to a normal particle size, may be conducted. In general, in order to increase agglomeration strength, a reassembling process wherein fines are agglomerated in the wet state, is progressed. Wherein, as the moisture content of fines is higher, agglomeration strength of fines increases, but too large reassembled mass may be generated during the reassembling process, thus causing a problem during process operation, and if the moisture content is low, the reassembling process may be easily progressed, but due to low agglomeration strength, the reassembly may be often crushed to fines again (refine). And, the fine reassembly thus obtained may have deteriorated properties such as centrifuge retention capacity (CRC) or absorbency under load (AUL) compared to normal particles, thus causing quality deterioration of superabsorbent polymer.

Thus, the preparation method according to one embodiment of the invention may further comprise a process of mixing the fine reassembly with the base resin powder, after adding water and additives to the fines and reassembling to prepare the fine reassembly.

When preparing the fine reassembly, using a mixing apparatus or mixer capable of adding shear force, the fines, additives and water may be mixed by stirring at a speed of about 10 to about 2000 rpm, about 100 to about 1000 rpm, or about 500 to about 800 rpm.

And, after the mixing, a drying process may be conducted, and specifically, the drying process may be conducted at about 120 to about 220° C., thus forming fine reassembly with improved agglomeration strength through covalent bonds, and the moisture content of fine reassembly may be controlled to about 1 to about 2 wt % within an appropriate time.

And, the drying process may be conducted using a common drying apparatus, but according to one embodiment of the invention, it may be conducted using a hot air drier, a paddle type drier or a forced-circulation type drier, and the like. And, temperature rise means for drying is not limited in terms of the constructions. Specifically, as heat sources that can be used, steam, electricity, ultraviolet rays, infrared rays, and the like may be mentioned, and heated fluid may be also used.

The fine reassembly obtained through the step of preparing fine reassembly has high agglomeration strength, and thus, a recrush rate after grinding, namely refine rate is low.

The grinding of the fine reassembly may be conducted such that the particle diameter of the fine reassembly may become about 150 to about 850 (m. As a grinder used to grind to such a particle diameter, specifically, a pin mill, a hammer mill, a screw mill, a roll mill, a disc mill or a jog mill, and the like may be used, but is not limited thereto.

In order to manage the properties of superabsorbent polymer powder finally productized after the grinding step, in general, reassembly powders obtained after grinding are classified according to particle diameter. Preferably, a step of classifying into reassembly fines having particle diameters of 150 μm or less (hereinafter, referred to as 'refines') and reassembly normal particles having particle diameters of greater than 150 m and 850 μm or less, may be further conducted.

The reassembly normal particles may be mixed with base resin powder prepared above, and then, prepared into superabsorbent polymer through the subsequent process. Wherein, the reassembly normal particles may be mixed in the content of 1 to 40 parts by weight, based on 100 parts by weight of the base resin powder.

(Step 3)

Next, the step 3 is a step of first surface crosslinking the base resin powder, or base resin powder optionally comprising reassembly normal particles while raising to a first temperature, in the presence of a first surface crosslinking agent.

The surface crosslinking increases the crosslinking density around the surface of superabsorbent polymer particles. In general, a surface crosslinking agent is applied on the surface of superabsorbent polymer particle. Thus, the reaction occurs on the surface of superabsorbent polymer particle, and thus, improves crosslinkability on the surface of particle without substantially influencing the inside of the particle. Thus, surface crosslinked superabsorbent polymer particle has higher crosslinking density around the surface than inside.

In the preparation method according to one embodiment of the invention, surface crosslinking comprises a first surface crosslinking step progressed while raising a temperature from the initial temperature to a first temperature (step 3), and a second surface crosslinking step progressed at a second temperature (step 4), wherein the second temperature is lower than the first temperature.

Compared to the existing surface crosslinking process wherein a surface crosslinking reaction is progressed while maintaining a temperature constantly at high temperature or a surface crosslinking reaction is progressed while raising a temperature, in case the first surface crosslinking step is progressed at relatively high temperature and the second surface crosslinking step is progressed at lower temperature than the first surface crosslinking step, the second surface crosslinking agent may be uniformly distributed on the surface of superabsorbent polymer, and thus, surface crosslinking strength may be uniformly improved, and thus, not only the properties of superabsorbent polymer relating to excellent absorption performance may be maintained, but also the anti-caking effect of superabsorbent polymer may be improved.

Specifically, the first temperature in the first surface crosslinking step may be 180° C. or more, more specifically 180 to 200° C., and the second temperature in the subsequent second surface crosslinking step may be 120 to 150° C. As explained, by conducting the first surface crosslinking reaction at high temperature of 180° C. or more, the surface of base resin may be sufficiently crosslinked, thus exhibiting excellent absorbency under load. If the first temperature is less than 180° C., the first surface crosslinking reaction may not sufficiently occur, and thus, it may be difficult to secure surface crosslinking strength, and as the result, 0.9 AUL fall rate may increase after anti-caking treatment. And, if the second temperature is greater than 150° C., solvents may be rapidly evaporated before the second surface crosslinking agent is sufficiently mixed with the first surface crosslinked base resin, and the second surface crosslinking agent may be locally absorbed in the first surface crosslinked base resin. As the result, a surface reaction is progressed while the second surface crosslinking agent is locally applied, and thus, the effect of the second surface crosslinking decreases, and absorption performances, particularly CRC of prepared superabsorbent polymer may be deteriorated. And, if the second temperature is less than 120° C., the second surface crosslinking reaction may not be sufficiently progressed, and thus, 0.9 AUL fall rate may significantly increase after anti-caking treatment of superabsorbent polymer. More specifically, the first temperature may be 180° C. or more, or 185° C. or more, and 200° C. or less, or 195° C. or less, or 190° C. or less, and the second temperature may be 120° C. or more, or 125° C. or more, or 130° C. or more, and 150° C. or less, or 145° C. or less, or 140° C. or less.

And, in the preparation method according to one embodiment, as the first surface crosslinking agent for the first surface crosslinking, compounds capable of reacting with the functional groups of the polymer and having smaller weight average molecular weight than the second surface crosslinking agent may be used. In case such a first surface crosslinking agent having smaller weight average molecular weight than the second surface crosslinking agent is subjected to surface crosslinking reaction at high temperature, the first surface crosslinking agent may penetrate deeply into the surface of superabsorbent polymer, thereby securing absorbency under load of superabsorbent polymer.

Specifically, as the first surface crosslinking agent, compounds having weight average molecular weight meeting the ratio of the weight average molecular weight of the second surface crosslinking agent to the weight average molecular weight of the first surface crosslinking agent of 1.8 or more, or 1.8 to 15, may be used.

More specifically, the first surface crosslinking agent may have weight average molecular weight of 50 to 200 g/mol, more specifically, weight average molecular weight of 50 g/mol or more, or 60 g/mol or more, or 70 g/mol or more, or 75 g/mol or more, and 200 g/mol or less, or 150 g/mol or less, or 120 g/mol or less, or 100 g/mol or less, or 90 g/mol or less, or 85 g/mol or less. The weight average molecular weight (Mw) of the first surface crosslinking agent may be measured using gel permeation chromatography, and specific measurement method and measurement conditions are as described later in the measurement method of the weight average molecular weight (Mw) of polycarboxylic acid, except that Mw value is derived using a calibration curve to a polystyrene standard specimen.

And, the first surface crosslinking agent is different from the second surface crosslinking agent.

For example, the first surface crosslinking agent may be a non-epoxy-based compound, and the second surface crosslinking agent may be an epoxy-based compound having larger weight average molecular weight than that of the first surface crosslinking agent, and capable of forming a covalent bond at 120 to 150° C.

Specifically, the first surface crosslinking agent may be a non-epoxy-based compound capable of forming a covalent bond at a temperature of 180° C. or more. More specifically, as the first surface crosslinking agent, polyhydric alcohol-based compounds or alkylene carbonate-based compounds, and the like may be mentioned, and one of them or mixtures thereof may be used.

As specific examples of the polyhydric alcohol-based compounds, ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol or glycerol, and the like may be mentioned, and one of them or mixtures thereof may be used.

And, as specific examples of the alkylene carbonate-based compounds, alkylene carbonate having a carbon number of 2 to 6, such as ethylene carbonate or propylene carbonate may be mentioned, and one of them, or mixtures thereof may be used.

More specifically, the first surface crosslinking agent may be one or more selected from polyhydric alcohol-based compounds or alkylene carbonate-based compounds meeting the above described molecular weight range condition, specifically the ratio of the weight average molecular weight of the second surface crosslinking agent to the weight average molecular weight of the first surface crosslinking agent being 1.8 or more, or 1.8 to 15. And, the first surface crosslinking agent may be one or more selected from polyhydric alcohol-based compounds or alkylene carbonate-based compounds having weight average molecular weight of 50 to 200 g/mol.

Such a first surface crosslinking agent may be used in the amount of 0.01 to 5 parts by weight, based on 100 parts by weight of base resin. If the amount of the first surface crosslinking agent used is less than 0.01 parts by weight, the effect according to the use of the first surface crosslinking agent may be insignificant, and thus, it may be difficult to secure absorbency under load of superabsorbent polymer. And, if the amount used exceeds 5 parts by weight, surface crosslinking may be excessively progressed, and thus, the properties, particularly absorption performance of superabsorbent polymer may be excessively deteriorated. More specifically, the first surface crosslinking agent may be used in the amount of 0.01 parts by weight or more, or 0.1 parts by weight or more, or 0.2 parts by weight or more, or 0.4 parts by weight or more, or 1 part by weight or more, and 5 parts by weight or less, or 3 parts by weight or less, or 2 parts by weight or less, or 1.5 parts by weight or less, based on 100 parts by weight of base resin.

And, during the first surface crosslinking, inorganic filler may be further introduced together with the first surface crosslinking agent.

As the inorganic filler, silica, fumed silica, clay, alumina, silica-alumina composite, titania, zinc oxide or silicate, and the like may be mentioned, and one of them or mixtures thereof may be used. The inorganic filler may be included in the content of 0.01 to 0.5 parts by weight, based on 100 parts by weight of base resin, and more specifically, it may be included in the content of 0.01 parts by weight or more, or 0.03 parts by weight or more, and 0.5 parts by weight or less, or 0.1 parts by weight or less, or 0.05 parts by weight or less.

And, during the first surface crosslinking, one or more additives such as organic acid or thickener may be optionally further introduced.

The organic acid performs a function for promoting the crosslinking reaction.

Specifically, the organic acid may be carboxylic acid such as oxalic acid, acetic acid, lactic acid, citric acid, fumaric acid, tartaric acid, or maleic acid, and one of them or mixtures thereof may be used. Among them, oxalic acid having excellent compatibility with the first surface crosslinking agent may be preferably used.

The organic acid may be introduced in the amount of 0.1 to 5 parts by weight, based on 100 parts by weight of base resin powder, and more specifically, in the amount of 0.1 parts by weight or more, or 0.15 parts by weight or more, and 5 parts by weight or less, or 3 parts by weight or less, or 1 part by weight or less, or 0.5 part by weight or less.

And, in case the first surface crosslinking reaction of base resin powder is conducted in the presence of a thickener, property deterioration may be minimized even after grinding. Specifically, as the thickener, one or more selected from polysaccharides and hydroxy-containing polymer may be used. As the polysaccharide, a gum-based thickener and a cellulose-based thickener, and the like may be used. As specific examples of the gum-based thickener, xanthan gum, arabic gum, karaya gum, tragacanth gum, ghatti gum, guar gum, locust bean gum and *psyllium* seed gum, and the like may be mentioned, and as specific examples of the cellulose-based thickener, hydroxypropyl methyl cellulose, carboxymethyl cellulose, methylcellulose, hydroxymethyl cellulose, hydroxyethyl cellulose, hydroxypropyl cellulose, hydroxyethyl methyl cellulose, hydroxymethyl propyl cellulose, hydroxyethyl hydroxypropyl cellulose, ethyl hydroxyethyl cellulose and methyl hydroxypropyl cellulose, and the like may be mentioned. Meanwhile, as specific examples of the hydroxy-containing polymer, polyethylene glycol and polyvinyl alcohol, and the like may be mentioned.

And, mixing of the first surface crosslinking agent with base resin may be conducted by a common mixing method. For example, the first surface crosslinking agent and base resin may be put in a reactor and mixed, or the first surface crosslinking agent may be sprayed to the base resin, or the base resin and surface crosslinking agent may be continuously supplied to a continuously operated mixer and mixed.

And, when mixing the first surface crosslinking agent with base resin, the first surface crosslinking agent and optionally introduced components, specifically inorganic additives, organic acid, a thickener, and the like, may be used while being dissolved or dispersed in a solvent. Wherein, as the solvent, water, methanol or a mixture thereof may be used. As such, in case a solvent is added, the first surface crosslinking agent may be uniformly distributed in the base resin, wherein through the control of the introduction amount, uniform dispersion of the surface crosslinking agent may be induced, and agglomeration of base resin may be prevented, and simultaneously, surface penetration depth of the crosslinking agent may be optimized. Specifically, the solvent may be used in the amount of 0.5 to 20 parts by weight, more specifically, 0.5 parts by weight or more, or 3 parts by weight or more, or 5 parts by weight or more, or 6 parts by weight or more, and 10 parts by weight or less, or 8 parts by weight or less, or 7.5 parts by weight or less, based on 100 parts by weight of base resin. And, in case the solvent comprises a mixture of water and methanol, the water and methanol may be included at the weight ratio of 1:2 to 2:1, or 1:1.2 to 1.5:1.

The first surface crosslinking process using the first surface crosslinking agent may be conducted while raising a temperature to a first temperature, specifically 180° C. or more, more specifically, 180 to 200° C., in the presence of the first surface crosslinking agent. As such, by conducting the first surface crosslinking reaction at high temperature, the surface of base resin may be sufficiently crosslinked, thereby exhibiting excellent absorbency under load. However, if the first temperature is less than 180° C., the first surface crosslinking reaction may not sufficiently occur, and thus, it may be difficult to secure surface crosslinking strength, and as the result, 0.9 AUL fall rate may increase after anti-caking treatment. Even more specifically, the first temperature may be 180° C. or more, or 185° C. or more, and 200° C. or less, or 195° C. or less, or 190° C. or less.

A temperature rise means for the first surface crosslinking is not specifically limited, and heat medium may be supplied or heat source may be directly supplied to heat. Wherein, as the heat medium that can be used, steam, hot air, temperature-raised fluid such as hot oil may be used, and the temperature of supplied heat medium may be appropriately selected considering the heat medium, temperature rise means and target temperature. Meanwhile, as the heat source directly supplied, electric heating or gas heating may be mentioned, but is not limited thereto.

And, the first surface crosslinking may further comprise a first maintenance process of maintaining the first temperature after raising to the first temperature. As such, in case the maintenance process is further included, surface crosslinking of base resin may be sufficiently uniformly achieved, and thus, absorbency under load of superabsorbent polymer may be further improved.

Specifically, the first maintenance process may be conducted for a time of 50% or more, more specifically, 50% or more, or 55% or more, or 60% or more, and 80% or less, or 70% or less, or 65% or less of the total time during which the first surface crosslinking is conducted. Wherein, the total time during which the first surface crosslinking is conducted means a time from when heating begins for temperature rise to the first temperature, specifically when the mixture of base resin and first surface crosslinking agent is heated, to when the first surface crosslinking or first surface crosslinking step is completed.

(Step 4)

Next, the step 4 is a step wherein the first surface crosslinked base resin prepared in the step 3 is subjected to a second surface crosslinking reaction at a second temperature, in the presence of a second surface crosslinking agent, to prepare superabsorbent polymer.

As the second surface crosslinking agent, an epoxy-based compound having larger weight average molecular weight than that of the first surface crosslinking agent may be used.

Specifically, the second surface crosslinking agent may have weight average molecular weight meeting the ratio of the weight average molecular weight of the second surface crosslinking agent to the weight average molecular weight of the first surface crosslinking agent being 1.8 or more, or 1.95 or more, or 2 or more, or 2.2 or more. However, if the ratio of the weight average molecular weight of the second surface crosslinking agent to the weight average molecular weight of the first surface crosslinking agent is too high outside the above range, hydrophilicity may significantly decrease, and thus, absorption performance of superabsorbent polymer may be deteriorated to the contrary, and thus, the second surface crosslinking agent may have weight average molecular weight meeting the ratio of the weight average molecular weight of the second surface crosslinking agent to the weight average molecular weight of the first surface crosslinking agent being 15 or less or 10 or less, or 5 or less, or 3 or less.

When the ratio of the weight average molecular weight of the second surface crosslinking agent to the weight average molecular weight of the first surface crosslinking agent is within the above range, the penetration speed of the second surface crosslinking agent may become slow compared to the first surface crosslinking agent, and thus, only the surface of particle may be effectively surface crosslinked. As the result, absorbency under load of superabsorbent polymer may be further improved.

More specifically, the second surface crosslinking agent may have weight average molecular weight of 100 to 600 g/mol, even more specifically, 100 g/mol or more, or 120 g/mol or more, or 150 g/mol or more, or 170 g/mol or more, and 500 g/mol or less, or 300 g/mol or less, or 250 g/mol or less, or 220 g/mol or less. The weight average molecular weight (Mw) of the second surface crosslinking agent may be measured using gel permeation chromatography, and specific measurement method and measurement conditions are as described later in the measurement method of the weight average molecular weight (Mw) of polycarboxylic acid, except that Mw value is derived using a calibration curve to a polystyrene standard specimen.

Even more specifically, in the preparation method, the first surface crosslinking agent may have weight average molecular weight of 50 to 200 g/mol, more specifically, 50 g/mol or more, or 60 g/mol or more, or 70 g/mol or more, or 75 g/mol or more, and 200 g/mol or less, or 150 g/mol or less, or 120 g/mol or less, or 100 g/mol or less, or 90 g/mol or less, or 85 g/mol or less, and the second surface crosslinking agent may have weight average molecular weight of 100 to 600 g/mol, more specifically 100 g/mol or more, or 120 g/mol or more, or 150 g/mol or more, or 170 g/mol or more, and 500 g/mol or less, or 300 g/mol or less, or 250 g/mol or less, or 220 g/mol or less, provided that the ratio of the weight average molecular weight of the second surface crosslinking agent to the weight average molecular weight of the first surface crosslinking agent is 1.8 or more, or 1.95 or more, or 2 or more, or 2.2 or more, and 15 or less or 10 or less, or 5 or less, or 3 or less.

And, since the second surface crosslinking reaction using the second surface crosslinking agent is conducted using residual heat during cooling after completion of the first surface crosslinking reaction, as the second surface crosslinking agent, compounds capable of rapidly forming covalent bonds with the acid groups, specifically carboxylic acid groups of the crosslinked polymer of water soluble ethylenically unsaturated monomers, at the reaction temperature range, specifically at 120 to 150° C., may be preferably used. For this purpose, as the second surface crosslinking agent, epoxy-based compounds having two or more epoxide functional groups capable of crosslinking with the crosslinked polymer existing on the surface of base resin powder, and having a boiling point of 150° C. or more under normal pressure or atmospheric pressure condition, more specifically, under 1+0.2 atm condition, may be used. If the boiling point is less than 150° C., due to residual heat of superabsorbent polymer, the surface crosslinking agent may be evaporated before reaction, and thus, efficiency may decrease compared to introduction amount. More specifically, the epoxy-based compound may have a boiling point of 150° C. or more, or 180° C. or more, or 200° C. or more, or 250° C. or more, or 260° C. or more, or 265° C. or more, and 500° C. or less, or 350° C. or less, or 300° C. or less, or 280° C. or less.

As the second surface crosslinking agent, specifically, one or more epoxy-based compounds, such as ethyleneglycol diglycidyl ether, 1,4-butanediol diglycidyl ether, propyleneglycol diglycidyl ether, hexanediol diglycidyl ether, diethyleneglycol diglycidyl ether, triethyleneglycol diglycidyl ether, dipropyleneglycol diglycidyl ether, tripropyleneglycol diglycidyl ether, glycerol triglycidyl ether, polypropyleneglycol diglycidyl ether, or polyethyleneglycol diglycidyl ether, and the like, may be used.

And, as the polyethyleneglycol diglycidyl ether or polypropyleneglycol diglycidyl ether, specifically those having weight average molecular weight of 200 to 600 g/mol may be used.

The weight average molecular weight (Mw) of the polyethyleneglycol diglycidyl ether or polypropyleneglycol diglycidyl ether may be measured using gel permeation chromatography, and specific measurement method and measurement conditions are as described later in the measurement method of the weight average molecular weight (Mw) of polycarboxylic acid, except that Mw value is derived using a calibration curve to a polystyrene standard specimen.

The second surface crosslinking agent may be used in the amount of 0.001 to 1 part by weight, based on 100 parts by weight of the first surface crosslinked base resin. If the amount of the second surface crosslinking agent is less than 0.001 parts by weight, second surface crosslinking may not be sufficiently achieved, and thus, the effect of improving absorption performance of superabsorbent polymer may be insignificant, and if it exceeds 1 part by weight, surface crosslinking may be excessively progressed, and thus, the properties, particularly, degree of dryness of superabsorbent polymer may be deteriorated. More specifically, the second surface crosslinking agent may be used in the amount of 0.001 parts by weight or more, or 0.003 parts by weight or more, or 0.005 parts by weight or more, and 1 part by weight or less, or 0.5 parts by weight or less, or 0.1 parts by weight or less, or 0.05 parts by weight or less, or 0.02 parts by weight or less, or 0.01 parts by weight or less, based on 100 parts by weight of the first surface crosslinked base resin.

And, during the second surface crosslinking, one or more selected from polycarboxylic acid or a salt thereof may be optionally further introduced together with the second surface crosslinking agent.

The polycarboxylic acid or salt thereof serves as a lubricant assisting in uniform application of the second surface crosslinking agent on the surface of the first surface crosslinked base resin powder. In general, among the properties of superabsorbent polymer, penetration rate is in trade-off relation with centrifuge retention capacity and absorbency under load, but in case the polycarboxylic acid or salt there of is introduced, superabsorbent polymer that not only has excellent absorption properties such as centrifuge retention capacity and absorbency under load, but also has improved penetration rate can be provided.

The polycarboxylic acid or salt thereof is not specifically limited as long as it is used during the preparation of superabsorbent polymer, and it may be personally prepared, or commercially available products such as ACYMA-GK™ (manufactured by Aezis Ltd.) may be also used.

Specifically, the polycarboxylic acid or salt thereof may be a copolymer or a salt thereof comprising one or more of the repeat units represented by the following Chemical Formula 2-a or the repeat units represented by the following Chemical Formula 2-b.

[Chemical Formula 2-a]

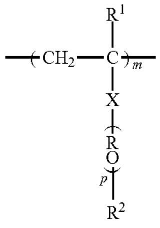

[Chemical Formula 2-b]

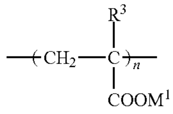

In the Chemical Formulas 2-a and 2-b, $R^1$, $R^2$ and $R^3$ are each independently, hydrogen or a C1-6 alkyl group, RO is a C2-4 oxyalkylene group, $M^1$ is hydrogen or monovalent metal or non-metal ion, X is —COO—, a C1-5 alkyloxy group or a C1-5 alkyldioxy group, m is an integer of 1 to 100, n is an integer of 1 to 1000, p is an integer of 1 to 150, and when p is 2 or more, two or more repeated —RO—'s may be identical to or different from each other.

Wherein, the polycarboxylic acid or salt thereof may be a copolymer or a salt thereof comprising one or more repeat units of different structures selected from the repeat units represented by the Chemical Formula 2-a; one or more repeat units of difference structures selected from the repeat units represented by the Chemical Formula 2-b; or repeat units represented by the Chemical Formula 2-1 and repeat units represented by the Chemical Formula 2-b.

And, the salt of polycarboxylic acid may be one or more selected from the group consisting of monovalent (alkali) metal salt, divalent metal salt, ammonium salt and organic amine salt of polycarboxylic acid.

More specifically, as the polycarboxylic acid or salt thereof, a random copolymer or a salt thereof comprising repeat units derived from hydrophilic monomers, such as alkoxy polyalkyleneglycol mono(meth)acrylic acid ester-based monomers (as representative example, methoxy polyethyleneglycol monomethacrylate (MPEGMAA)), and (meth)acrylic acid or its ester-based monomers (as representative example, (meth)acrylic acid, (meth)acrylate), may be advantageously used.

And, in order to better exhibit the effect according to the addition of the polycarboxylic acid or salt thereof, it is preferable that the polycarboxylic acid or salt thereof has weight average molecular weight of 500 to 1,000,000 g/mol, more specifically, 500 g/mol or more, or 5,000 g/mol or more, or 10,000 g/mol or more, or 35,000 g/mol or more, or 40,000 g/mol or more, and 1,000,000 g/mol or less, or 800,000 g/mol or less, or 60,000 g/mol or less. If the molecular weight of the polycarboxylic acid or salt thereof is less than 500 g/mol, there is a concern about deterioration of lubrication action, and if it exceeds 1,000,000 g/mol, there is a concern about deterioration of water solubility.

Meanwhile, the weight average molecular weight (Mw) of polycarboxylic acid or salt thereof may be measured using gel permeation chromatography. Specifically, as gel permeation chromatography (GPC) device, PL-GPC220 device manufactured by Waters was used, and PLgel MIX-B column (length 300 mm) manufactured by Polymer Laboratories was used. Wherein, measurement temperature was 160° C., 1,2,4-trichlorobenzene was used as a solvent, and flow rate was 1 mL/min. 10 mg of the polycarboxylic acid or salt thereof was dissolved in 1,2,4-trichlorobenzene containing 0.0125% BHT at 160° C. for 10 hours for pretreatment, using PL-SP260 (manufactured by Agilent Technology), and prepared at the concentration of 10 mg/10 mL, and then, fed in an amount of 200 μL. Using a calibration curve formed using polystyrene standard specimens, Mw value was derived. The weight average molecular weights of the polystyrene standards were 2,000 g/mol, 10,000 g/mol, 30,000 g/mol, 70,000 g/mol, 200,000 g/mol, 700,000 g/mol, 2,000,000 g/mol, 4,000,000 g/mol, and 10,000,000 g/mol.

The polycarboxylic acid or salt thereof may be introduced in the amount of 0.01 parts by weight or more, or 0.03 parts by weight or more, or 0.035 parts by weight or more, and 0.1 parts by weight or less, or 0.08 parts by weight or less, or 0.075 parts by weight or less, or 0.05 parts by weight or less, based on 100 parts by weight of the first surface crosslinked base resin.

And, during the second surface crosslinking, inorganic filler may be further introduced together with the second surface crosslinking agent. The inorganic filler is as explained above, and may be included in the amount of 0.01 to 0.5 parts by weight, or 0.1 to 0.5 parts by weight, based on 100 parts by weight of the first surface crosslinked base resin.

And, during the second surface crosslinking, a thickener may be further introduced together with the second surface crosslinking agent. The thickener is as explained above, and may be included in the amount of 0.01 to 0.5 parts by weight, or 0.1 to 0.5 parts by weight, based on 100 parts by weight of the first surface crosslinked base resin.

And, a method of mixing the second surface crosslinking agent with the first surface crosslinked base resin is not limited. For example, the second surface crosslinking agent and first surface crosslinked base resin may be put in a reactor and mixed, or the second surface crosslinking agent may be sprayed to the base resin, or the base resin and second surface crosslinking agent may be continuously supplied to a continuously operated mixer and mixed.

And, when mixing the second surface crosslinking agent with first surface crosslinked base resin, a solvent such as water or methanol may be further added such that the second surface crosslinking agent may be uniformly dispersed in the first surface crosslinked base resin. And, by controlling the amount of the solvent added, uniform dispersion of the second surface crosslinking agent may be induced, agglomeration of the first surface crosslinked base resin may be prevented, and simultaneously, surface crosslinking depth of the second surface crosslinking agent may be optimized. Specifically, the solvent may be used in the amount of 0.5 to 10 parts by weight, based on 100 parts by weight of the first surface crosslinked base resin.

Meanwhile, the second surface crosslinking reaction using the second surface crosslinking agent is conducted at a second temperature, specifically at 120 to 150° C.

If the second temperature is greater than 150° C., before the second surface crosslinking agent is sufficiently mixed with the first surface crosslinked base resin, the solvent may be rapidly evaporated, and thus, the second surface crosslinking agent may be locally absorbed in the first surface crosslinked base resin. As the result, a surface reaction is progressed while the second surface crosslinking agent is locally applied, and thus, the effect of the second surface crosslinking may be deteriorated. And, if the second temperature is less than 120° C., the second surface crosslinking reaction may not be sufficiently progressed, and thus, 0.9 AUL fall rate may significantly increase after anti-caking treatment of superabsorbent polymer. Even more specifically, the second temperature may be 120° C. or more, or 125° C. or more, or 130° C. or more, and 150° C. or less, or 145° C. or less, or 140° C. or less.

And, the second surface crosslinking reaction may be conducted under cooling condition of lowering a temperature within the above temperature range.

According to the preparation method of the present technology, first surface crosslinking is conducted at high temperature, and then, second surface crosslinking is conducted using residual heat after the first surface crosslinking. Thus, by controlling the introduction time of the second surface crosslinking agent and cooling conditions, the second surface crosslinking reaction may be achieved using the residual heat after the first surface crosslinking reaction as much as possible. And, compared to the case of conducting the second surface crosslinking reaction while maintaining a constant temperature, penetration speed of the second surface crosslinking agent into the surface of superabsorbent polymer may be more easily controlled.

Specifically, the second surface crosslinking may be conducted by introducing the second surface crosslinking agent when the temperature of the first surface crosslinked base resin is 140 to 150° C., and lowering the temperature to 120 to 130° C.

In case the second surface crosslinking is conducted under the above conditions, the efficiency of the second surface crosslinking reaction may be further increased, and thereby, 0.9 AUL fall rate after anti-caking treatment of superabsorbent polymer may be further decreased. If the temperature of the first surface crosslinked base resin powder is less than 140° C. when introducing the second surface crosslinking agent, it may be difficult to obtain the effect of improving the efficiency of the second surface crosslinking reaction as much as possible. And, if the temperature of the first surface crosslinked base resin powder is greater than 150° C. when introducing the second surface crosslinking agent, before the second surface crosslinking agent is sufficiently mixed with the first surface crosslinked base resin, solvents may be rapidly evaporated, and thus, locally absorbed in the first surface crosslinked base resin. As the result, a surface reaction is progressed while the second surface crosslinking agent is locally applied, the effect of the second surface crosslinking may be deteriorated.

And, by controlling the cooling speed during the second surface crosslinking reaction under the above cooling conditions, the efficiency of the surface crosslinking reaction may be increased, and thus, the properties of prepared superabsorbent polymer may be further improved.

Specifically, the second surface crosslinking reaction may be conducted by introducing the second surface crosslinking agent when the temperature of the first surface crosslinked base resin powder is 140 to 150° C., and decreasing the temperature to 120 to 130° C. at a cooling speed of −1.5 to −2.0° C./min. Wherein, in the cooling speed, "−" means that the reaction is progressed while decreasing temperature.

And, if the cooling speed is less than −1.5° C./min during the second surface crosslinking, due to rapid evaporation of the solvent in the surface crosslinking agent and the resulting low penetration depth of the surface crosslinking agent, it may be difficult to secure sufficient surface crosslinking strength. And, if the cooling speed is greater than −2.0° C./min, due to rapid temperature decrease, the reaction speed of the surface crosslinking agent may become slow, and thus, the reaction may not be sufficiently progressed, and there is a concern about deterioration of surface crosslinking strength.

And, the cooling during the second surface crosslinking reaction may be achieved by natural cooling in which the temperature of reaction system is naturally lowered to a room temperature level after completion of the first surface crosslinking reaction, or it may be achieved by common cooling methods such as circulation of cold wind, cold water or cooling oil. For example, the cooling may be conducted by introducing the second surface crosslinking agent, and then, putting a reactor or reservoir containing the reaction system in an oil circulation tank, and circulating low temperature oil.

Meanwhile, the step 4 may further comprise a process of classifying the second surface crosslinked base resin.

Through the step of classifying the second surface crosslinked base resin according to particle diameter, the properties of finally productized superabsorbent polymer powder may be managed. It is appropriate that superabsorbent polymer obtained through the grinding and classification processes is prepared and provided with a particle diameter of about 150 to 850 (m. More specifically, at least about 95 wt % or more of the second surface crosslinked base resin may have particle diameter of about 150 to 850 μm, and the content of fines having particle diameter less than about 150 μm may be less than about 3 wt %. As such, by controlling the particle diameter distribution of the superabsorbent polymer within a preferable range, the finally prepared superabsorbent polymer may exhibit excellent absorption properties. Thus, in the classification step, polymer having particle diameter of about 150 to about 850 (m may be classified and productized.

Superabsorbent polymer prepared by the preparation method of the present technology as explained above comprises: base resin powder comprising crosslinked polymer of water soluble ethylenically unsaturated monomers having acid groups of which at least a part are neutralized; and a surface crosslinked layer positioned on the base resin powder, wherein the surface crosslinked layer comprises first crosslinked polymer in which a part of the crosslinked polymer is additionally crosslinked by a first surface crosslinking agent; and second crosslinked polymer in which the residue of the crosslinked polymer is additionally crosslinked by a second surface crosslinking agent. Wherein, the first and second surface crosslinking agents are as explained above.

More specifically, in the surface crosslinked layer, the first crosslinked polymer is positioned adjacent to the base resin powder, and the second crosslinked polymer is positioned outside of the superabsorbent polymer. As such, since the crosslinking density increases toward the outside of superabsorbent polymer, the superabsorbent polymer may have improved surface strength, and the effect of decreasing AUL fall according to anti-caking treatment may be exhibited.

Specifically, centrifuge retention capacity (CRC) of the superabsorbent polymer to a saline solution (0.9 wt % sodium chloride aqueous solution) for 30 minutes, measured according to EDANA method 442.0-96, may be 30 g/g or more, more specifically, 32 g/g or more, and as the value is higher, it is more excellent, and thus, the upper limit is not substantially limited, but for example, it may be 50 g/g or less, or 40 g/g or less.

And, 0.9 AUL fall rate of the superabsorbent polymer, calculated by the following Mathematical Formula 1, is 0.05 or less, more specifically, 0.03 or less. As the 0.9 AUL fall rate is smaller, it is more excellent, and thus, there is no substantial lower limit, but for example, it may be 0.001 or more, or 0.01 or more, or 0.02 or more.

$$0.9 \text{ AUL fall rate} = [(A-B)/A] \qquad \text{[Mathematical Formula 1]}$$

in the Mathematical Formula 1,

A is 0.9 AUL of superabsorbent polymer before anti-caking treatment, and is absorbency under load, measured after superabsorbent polymer before anticaking-treated is swollen under load of 0.9 psi for 1 hour according to EDANA method 442.0-96, B is 0.9 AUL of anti-caking treated superabsorbent polymer, and is absorbency under load, measured after anti-caking treatment is conducted by dry mixing 100 parts by weight of superabsorbent polymer and 0.0005 to 0.001 parts by weight, more specifically 0.001 parts by weight of fumed silica (anti-caking agent) at 200 rpm for 30 seconds to 1 minute, more specifically, for 1 minute, and then, the anti-caking treated superabsorbent polymer is swollen under load of 0.9 psi for 1 hours according to EDANA method 442.0-96.

Specifically, 0.9 AUL of the superabsorbent polymer before anti-caking treatment may be 15 to 30, and 0.9 AUL after anti-caking treatment may be 15 to 25.

Specifically, 0.9 AUL of the superabsorbent polymer before anti-caking treatment may be 15 to 30, or 18 to 23, and 0.9 AUL after anti-caking treatment may be 15 to 25, or 17 to 22.

Thus, the superabsorbent polymer may be very preferably applied for various hygienic goods such as adult diapers, and particularly, it may be effectively used for hygienic goods having decreased pulp content. The hygienic goods may include disposable absorption products, preferably diapers, and the diapers may be diapers for children or adult.

Advantageous Effects

According to the preparation method of the present technology, by increasing the surface crosslinking strength of superabsorbent polymer, superabsorbent polymer with no or little decrease in absorbency under load even after anti-caking treatment can be prepared.

DETAILED DESCRIPTION OF THE EMBODIMENTS

Hereinafter, the actions and effects of the present technology will be explained in detail through the specific examples. However, these examples are presented only as the illustrations of the invention, and the scope of the right of the invention is not determined thereby.

<Preparation of Base Resin>

Preparation Example 100 parts by weight of acrylic acid, 126.8 parts by weight of 31.5% caustic soda (NaOH), 46 parts by weight of water, and the following components were mixed to prepare a monomer composition.

internal crosslinking agent: polyethyleneglycol diacrylate (PEGDA; Mw=400) 0.2 parts by weight (2000 ppmw)

polymerization initiator: bis(2,4,6-trimethylbenzoyl)phenylphosphine oxide (photopolymerization initiator) 0.008 parts by weight (80 ppmw) and sodium persulfate (thermal polymerization initiator) 0.12 parts by weight (1200 ppmw)

The composition was introduced into a feed section of a polymerization reactor consisting of continuously moving conveyor belt, and irradiated by ultraviolet rays with UV irradiation device for 1.5 minutes (about 2 mW/$cm^2$) to progress a polymerization reaction, thus obtaining hydrogel polymer as a product.

The hydrogel polymer was cut through a cutter. Subsequently, the hydrogel polymer was dried in a hot air drier of 190° C. for 40 minutes, and dried hydrogel polymer was ground with a grinder. Subsequently, polymers having particle sizes of 150 to 850 μm were classified using a sieve to obtain base resin powder.

The CRC value of the obtained base resin powder was about 54 g/g.

<Preparation of Superabsorbent Polymer>

Example 1

Based on 100 parts by weight of the base resin powder prepared in the Preparation Example, 4 parts by weight of water, 3 parts by weight of methanol, 1.5 parts by weight of ethylene carbonate (weight average molecular weight=88.06 g/mol) as a first surface crosslinking agent, and 0.05 parts by weight of fumed silica were mixed to prepare a first surface crosslinking solution.

To 100 parts by weight of the base resin powder prepared in the Preparation Example, the first surface crosslinking solution was added, and sufficiently mixed while stirring at a speed of about 200 rpm for less than 10 seconds using a high speed mixer. The resulting mixture was introduced into a reactor, and after raising a temperature to about 180° C. for about 20 minutes, it was reacted for 30 minutes while maintaining the raised temperature, thus conducting first surface crosslinking (first surface crosslinking, total reaction time 50 minutes).

After the first surface crosslinking was completed, when the temperature of the reaction system decreased to 150° C., a second surface crosslinking solution prepared by mixing, based on 100 parts by weight of the first surface crosslinked base resin, 3 parts by weight of water, 0.02 parts by weight of ethyleneglycol diglycidyl ether (weight average molecular weight=174.19 g/mol, boiling point: 266.8° C. (at 1 atm)) as a second surface crosslinking agent, and 0.1 parts by weight of 50 wt % polycarboxylic acid aqueous solution (ACYMA-GK™, manufactured by Aezis Ltd.) was introduced, and sufficiently mixed while stirring at a speed of about 200 rpm for less than 10 seconds using a high speed mixer.

The resulting mixture was introduced in a stirrer, and second surface crosslinking was conducted while stirring without heating. Wherein, in the stirring process, a reservoir containing the mixture was put in an oil circulation tank and a temperature was decreased while circulating oil, thereby decreasing the reaction temperature from 150° C. to 120° C. at a cooling speed of −1.5° C./min (second surface crosslinking, total reaction time: 20 minutes).

After the surface crosslinking was completed, the obtained resin powder was put in a grinder and ground, and classified using a sieve to obtain superabsorbent polymer having particle diameter of 150 to 850 μm.

Example 2

Based on 100 parts by weight of the base resin powder prepared in the Preparation Example, 3 parts by weight of water, 3.5 parts by weight of methanol, 1 part by weight of ethylene carbonate (weight average molecular weight=88.06 g/mol) as a first surface crosslinking agent, and 0.03 parts by weight of fumed silica were mixed to prepare a first surface crosslinking solution.

To 100 parts by weight of the base resin powder prepared in the Preparation Example, the first surface crosslinking solution was added, and sufficiently mixed while stirring at a speed of about 200 rpm for less than 10 seconds using a high speed mixer. The resulting mixture was introduced into a reactor, and after raising a temperature to about 180° C. for about 20 minutes, it was reacted for 30 minutes while maintaining the raised temperature, thus conducting first surface crosslinking (first surface crosslinking, total reaction time 50 minutes).

And then, when the temperature of the reaction system decreased to 150° C., a second surface crosslinking solution prepared by mixing, based on 100 parts by weight of the first surface crosslinked base resin, 3 parts by weight of water, 0.005 parts by weight of 1,4-butanediol diglycidyl ether (weight average molecular weight=202.25 g/mol, boiling point: 266° C.) as an epoxy-based second surface crosslinking agent, and 0.07 parts by weight of 50 wt % polycarboxylic acid aqueous solution (ACYMA-GK™, manufactured by Aezis Ltd.) was introduced, and sufficiently mixed while stirring at a speed of about 200 rpm for less than 10 seconds using a high speed mixer.

The resulting mixture was introduced in a stirrer, and second surface crosslinking was conducted while stirring without heating. Wherein, in the stirring process, a reservoir containing the mixture was put in an oil circulation tank and a temperature was decreased while circulating oil, thereby decreasing the reaction temperature from 150° C. to 120° C. at a cooling speed of −1.5° C./min (second surface crosslinking, total reaction time: 20 minutes).

After the surface crosslinking was completed, the obtained resin powder was put in a grinder and ground, and classified using a sieve to obtain superabsorbent polymer having particle diameter of 150 to 850 μm.

Example 3

Based on 100 parts by weight of the base resin powder prepared in the Preparation Example, 4 parts by weight of water, 3.5 parts by weight of methanol, 0.2 parts by weight of 1,3-propanediol (weight average molecular weight=79.09 g/mol) as a first surface crosslinking agent, 0.15 parts by weight of oxalic acid, and 0.01 parts by weight of fumed silica were mixed to prepare a first surface crosslinking solution.

To 100 parts by weight of the base resin powder prepared in the Preparation Example, the first surface crosslinking solution was added, and sufficiently mixed while stirring at a speed of about 200 rpm for less than 10 seconds using a high speed mixer. The resulting mixture was introduced into a reactor, and after raising a temperature to about 190° C. for about 20 minutes, it was reacted for 20 minutes while maintaining the raised temperature, thus conducting first surface crosslinking (first surface crosslinking, total reaction time 40 minutes).

And then, when the temperature of the reaction system decreased to 150° C., a second surface crosslinking solution prepared by mixing, based on 100 parts by weight of the first surface crosslinked base resin, 3 parts by weight of water, 0.005 parts by weight of ethyleneglycol diglycidyl ether (weight average molecular weight=174.19 g/mol, boiling point: 266.8° C. (at 1 atm)) as a second surface crosslinking agent, and 0.15 parts by weight of 50 wt % polycarboxylic acid aqueous solution (ACYMA-GK™, manufactured by Aezis Ltd.) was introduced, and sufficiently mixed while stirring at a speed of about 200 rpm for less than 10 seconds using a high speed mixer.

The resulting mixture was introduced in a stirrer, and second surface crosslinking was conducted while stirring without heating. Wherein, in the stirring process, a reservoir containing the mixture was put in an oil circulation tank and a temperature was decreased while circulating oil, thereby decreasing the reaction temperature from 150° C. to 130° C.

at a cooling speed of −2.0° C./min (second surface crosslinking, total reaction time: 10 minutes).

After the surface crosslinking was completed, the obtained resin powder was put in a grinder and ground, and classified using a sieve to obtain superabsorbent polymer having particle diameter of 150 to 850 μm.

Example 4

Based on 100 parts by weight of the base resin powder prepared in the Preparation Example, 4 parts by weight of water, 3.5 parts by weight of methanol, 0.4 parts by weight of 1,3-propanediol (weight average molecular weight=79.09 g/mol) as a first surface crosslinking agent, 0.23 parts by weight of oxalic acid, and 0.04 parts by weight of fumed silica were mixed to prepare a first surface crosslinking solution.

To 100 parts by weight of the base resin powder prepared in the Preparation Example, the first surface crosslinking solution was added, and sufficiently mixed while stirring at a speed of about 200 rpm for less than 10 seconds using a high speed mixer. The resulting mixture was introduced into a reactor, and after raising a temperature to about 185° C. for about 20 minutes, it was reacted for 25 minutes while maintaining the raised temperature, thus conducting first surface crosslinking (first surface crosslinking, total reaction time 45 minutes).

And then, when the temperature of the reaction system decreased to 140° C., a second surface crosslinking solution prepared by mixing, based on 100 parts by weight of the first surface crosslinked base resin, 3 parts by weight of water, 0.01 parts by weight of ethyleneglycol diglycidyl ether (weight average molecular weight=174.19 g/mol, boiling point: 266.8° C. (at 1 atm)) as a second surface crosslinking agent, and 0.15 parts by weight of 50 wt % polycarboxylic acid aqueous solution (ACYMA-GK™, manufactured by Aezis Ltd.) was introduced, and sufficiently mixed while stirring at a speed of about 200 rpm for less than 10 seconds using a high speed mixer.

The resulting mixture was introduced in a stirrer, and second surface crosslinking was conducted while stirring without heating. Wherein, in the stirring process, a reservoir containing the mixture was put in an oil circulation tank and a temperature was decreased while circulating oil, thereby decreasing the reaction temperature from 140° C. to 120° C. at a cooling speed of −1.5° C./min (second surface crosslinking, total reaction time: 13 minutes).

After the surface crosslinking was completed, the obtained resin powder was put in a grinder and ground, and classified using a sieve to obtain superabsorbent polymer having particle diameter of 150 to 850 μm.

Comparative Example 1

Superabsorbent polymer was prepared by the same method as Example 1, except that only the first surface crosslinking was conducted in Example 1.

Comparative Example 2

Superabsorbent polymer was prepared by the same method as Example 2, except that only the first surface crosslinking was conducted in Example 2.

Comparative Example 3

Superabsorbent polymer was prepared by the same method as Comparative Example 1, except that the content of ethylene carbonate in the first surface crosslinking solution was increased to 1.8 parts by weight in Comparative Example 1.

Comparative Example 4

Based on 100 parts by weight of the base resin powder prepared in the Preparation Example, 3 parts by weight of water, 0.02 parts by weight of ethyleneglycol diglycidyl ether (weight average molecular weight=174.19 g/mol, boiling point: 266.8° C. (at 1 atm)) as an epoxy-based surface crosslinking agent, and 0.1 parts by weight of 50 wt % polycarboxylic acid aqueous solution (ACYMA-GK™, manufactured by Aezis Ltd.) were mixed to prepare a first surface crosslinking solution.

To 100 parts by weight of the base resin powder prepared in the Preparation Example, the first surface crosslinking solution was added, and sufficiently mixed while stirring at a speed of about 200 rpm for less than 10 seconds using a high speed mixer. The resulting mixture was introduced into a reactor, and reacted at about 130° C. for 20 minutes, thus conducting first surface crosslinking (first surface crosslinking, total reaction time 20 minutes).

To 100 parts by weight of the first surface crosslinked base resin, a second surface crosslinking solution prepared by mixing, based on 100 parts by weight of the first surface crosslinked base resin, 4 parts by weight of water, 3 parts by weight of methanol, 1.5 parts by weight of ethylene carbonate (weight average molecular weight=88.06 g/mol), and 0.05 parts by weight of fumed silica was introduced, and sufficiently mixed while stirring at a speed of about 200 rpm for less than 10 seconds using a high speed mixer.

The resulting mixture was introduced in a stirrer, and after raising the temperature to about 180° C. for about 20 minutes, it was reacted for 30 minutes while maintaining the raised temperature, thus conducting second surface crosslinking (second surface crosslinking, total reaction time 50 minutes).

After the surface crosslinking was completed, the obtained resin powder was put in a grinder and ground, and classified using a sieve to obtain superabsorbent polymer having particle diameter of 150 to 850 μm.

Comparative Example 5

Superabsorbent polymer was prepared by the same method as Example 1, except that the second surface crosslinking solution was introduced when the temperature of the reaction system was lowered to 110° C., after the first surface crosslinking was completed, and that the second surface crosslinking was conducted while decreasing the reaction temperature from 110° C. to 80° C. at a cooling speed of −1.5° C./min in Example 1.

Comparative Example 6

Superabsorbent polymer was prepared by the same method as Example 1, except that 1,3-butadiene diepoxide (weight average molecular weight: 86.01 g/mol) was used as an epoxy-based second surface crosslinking agent, instead of ethyleneglycol diglycidyl ether when preparing the second surface crosslinking solution of Example 1.

Comparative Example 7

Superabsorbent polymer was prepared by the same method as Example 2, except that after the first surface crosslinking, to 100 parts by weight of the first surface crosslinked base resin, a second surface crosslinking solution prepared by mixing 3 parts by weight of water, 0.03 parts by weight of PEG600 (boiling point 200° C. (at 1 atm))), and 0.1 parts by weight of 50% polycarboxylic acid aqueous solution was introduced, and the second surface crosslinking reaction was conducted at 180° C. for total reaction time of 50 minutes in Example 2.

Comparative Example 8

Superabsorbent polymer was prepared by the same method as Example 1 except that 0.05 parts by weight of aluminum sulfate (Mw: 342.15 g/mol) was used instead of ethyleneglycol diglycidyl ether as an epoxy-based second surface crosslinking agent when preparing the second surface crosslinking solution of Example 1.

Experimental Example

For the superabsorbent polymers obtained in Examples and Comparative Examples, absorption related properties were measured as follows.

(1) Centrifuge Retention Capacity (CRC)

Centrifuge retention capacity (CRC) was measured according to EDANA method WSP 241.3.

Specifically, superabsorbent polymer having particle diameter of 300 to 600 μm, passing through US standard 30 mesh screen and remaining on US standard 50 mesh screen was prepared. And, $W_0$ (g, about 0.2 g) of the superabsorbent polymer having particle diameter of 300 to 600 μm was uniformly put in an envelope made of non-woven fabric and the envelope was sealed. And, the envelope was dip in a 0.9 wt % saline solution. After 30 minutes, the envelope was drained at 250 G for 3 minutes using a centrifuge, and then, the weight $W_4$ (g) of the envelope was measured. Meanwhile, the same operation was conducted using an empty envelope without superabsorbent polymer, and then, the weight $W_3$ (g) at that time was measured.

Using the weights thus obtained, centrifuge retention capacity was confirmed by the following Mathematical Formula 2.

$$\text{CRC (g/g)}=\{[W_4\text{ (g)}-W_3\text{ (g)}]/W_0\text{ (g)}\}-1 \quad \text{[Mathematical Formula 2]}$$

In the Mathematical Formula 2, $W_0$ (g) is the initial weight (g) of superabsorbent polymer having particle diameter of 300 μm to 600 μm, $W_3$ (g) is the weight of the apparatus without superabsorbent polymer, measured after draining at 250 G for 3 minutes using a centrifuge, $W_4$ (g) is the weight of the apparatus including superabsorbent polymer, measured after dipping superabsorbent polymer having particle diameter of 300 μm to 600 μm in 0.9 wt % saline solution at room temperature for 30 minutes to absorb, followed by draining at 250 G for 3 minutes using a centrifuge.

(2) Absorbency Under Load (AUL)

The superabsorbent polymers prepared in Examples and Comparative Examples were anti-caking treated, and then, 0.9 AUL of each superabsorbent polymer was measured, and from the result, fall rate of absorbency under load after anti-caking treatment was calculated.

Specifically, the anti-caking treatment of superabsorbent polymer was conducted by putting 100 parts by weight of superabsorbent polymer and 0.001 parts by weight of fumed silica anti-caking agent (Evonik, Aerosil®200) in a polyethylene (PE) bottle, and dry mixing at 200 rpm for 30 seconds using a vortex mixer (IKA company MS3).

And, before/after the anti-caking treatment, 0.9 psi absorbency under load (AUL) of the superabsorbent polymer to a saline solution was measured according to EDANA method 442.0-96.

Specifically, on the bottom of a plastic cylinder having an inner diameter of 25 mm, a 400 mesh screen was installed. And, $W_0$ (g, about 0.16 g) of superabsorbent polymer of which absorbency under load is to be measured was uniformly sprayed on the screen under room temperature and 50% humidity. And then, a piston capable of uniformly applying a load of 6.3 kPa (0.9 psi) was added on the superabsorbent polymer. Wherein, as the piston, a piston having an outer diameter slightly smaller than 25 mm was used such that there was no gap with the inner wall of the cylinder and the up and down movement was not hindered. And, the weight $W_5$ (g) of the apparatus was measured. And, then, inside a petri dish having a diameter of 150 mm, a glass filter having a diameter of 90 mm and a thickness of 5 mm was laid, and a 0.9 wt % saline solution was poured. Wherein, the saline solution was poured such that the water level of the saline solution became horizontal to the upper side of the glass filter. And, one piece of a filter paper having a diameter of 90 mm was laid on the glass filter. And then, the above apparatus was put on the glass filter such that the superabsorbent polymer in the apparatus was swollen by the saline solution under load. After 1 hour, the weight $W_6$ (g) of the apparatus containing swollen superabsorbent polymer was measured.

Using the measured weights, absorbency under load was calculated according to the following Mathematical Formula 3.

$$\text{AUL (g/g)}=[W_6\text{ (g)}-W_5\text{ (g)}]/W_0\text{ (g)} \quad \text{[Mathematical Formula 3]}$$

In the Mathematical Formula 3, $W_0$ (g) is the initial weight (g) of superabsorbent polymer, $W_5$ (g) is the sum of the weight of superabsorbent polymer and the weight of the apparatus capable of applying load to the superabsorbent polymer, $W_6$ (g) is the sum of the weight of superabsorbent polymer and the weight of the apparatus capable of applying load to the superabsorbent polymer, after absorbing a saline solution to the superabsorbent polymer under load of 0.9 psi for 1 hour.

Using the above measured 0.9 AUL before/after anti-caking treatment, 0.9 AUL fall rate was calculated according to the following Mathematical Formula 1:

$$\text{0.9 AUL fall rate}=[(A-B)/A] \quad \text{[Mathematical Formula 1]}$$

(in the Mathematical Formula 1,

A is 0.9 AUL of superabsorbent polymer before anti-caking treatment, and is absorbency under load measured after superabsorbent polymer before anticaking treated is swollen under load of 0.9 psi for 1 hour according to EDANA method 442.0-96, and B is 0.9 AUL of anti-caking treated superabsorbent polymer, and absorbency under load measured after anti-caking treatment is conducted by dry mixing 100 parts by weight of the superabsorbent polymer and 0.0005 to 0.001 parts by weight of fumed silica as an anticaking agent at 200 rpm for 30 seconds to 1 minute, and then, the anticaking treated superabsorbent polymer is swollen under load of 0.9 psi for 1 hour according to EDANA method 442.0-96.

The measurement results were shown in the following Table 1.

TABLE 1

| | CRC (g/g) | 0.9 AUL before anti-caking treatment | 0.9 AUL after anti-caking treatment | 0.9 AUL fall rate |
|---|---|---|---|---|
| Example 1 | 30.0 | 22.1 | 21.7 | 0.02 |
| Example 2 | 32.4 | 19.3 | 18.8 | 0.03 |
| Example 3 | 33.0 | 18.8 | 17.9 | 0.05 |
| Example 4 | 31.5 | 19.8 | 18.8 | 0.05 |
| Comparative Example 1 | 30.2 | 21.8 | 18.4 | 0.16 |
| Comparative Example 2 | 32.5 | 18.6 | 15 | 0.19 |
| Comparative Example 3 | 28.8 | 22.8 | 20.5 | 0.10 |
| Comparative Example 4 | 30.2 | 20.1 | 16.2 | 0.19 |
| Comparative Example 5 | 30.0 | 22.0 | 18.9 | 0.14 |
| Comparative Example 6 | 29.6 | 22.1 | 20.3 | 0.08 |
| Comparative Example 7 | 30.5 | 20.3 | 17.9 | 0.12 |
| Comparative Example 8 | 29.9 | 21.5 | 19.8 | 0.08 |

As the results of experiment, the superabsorbent polymers of Examples 1 to 4 exhibited excellent CRC compared to Comparative Examples, and 0.9 AUL fall rate was significantly decreased even after anti-caking treatment.

On the contrary, in the case of Comparative Example 1 and 2 wherein only the first surface crosslinking was conducted, 0.9 AUL fall rate after anti-caking treatment was as large as 0.15 or more, and in the case of Comparative Example 3 wherein only the first crosslinking was conducted but the content of the surface crosslinking agent was increased, 0.9 AUL fall rate was decreased compared to Comparative Examples 1 and 2, but 0.9 AUL fall rate was significantly increased compared to Examples.

And, in the case of Comparative Example 4 wherein the first and second surface crosslinking conditions of the present technology were not fulfilled, 0.9 AUL fall rate was even larger than those of Comparative Examples 1 to 3 wherein only the first surface crosslinking was conducted. In the case of Comparative Example 4, despite two times surface crosslinking, due to the use of a surface crosslinking agent having large weight average molecular weight during the first surface crosslinking, the surface crosslinking agent could not penetrate deeply inside the surface of the superabsorbent polymer, and thereafter, since the second surface crosslinking was conducted using a surface crosslinking agent having small weight average molecular weight, strength of surface crosslinking was not sufficiently secured compared to Comparative Examples 1 to 3.

And, in the case of Comparative Example 5 wherein temperature was too low during the second surface crosslinking, the second surface crosslinking reaction was not sufficiently progressed, and thus, 0.9 AUL fall rate after anti-caking treatment was large. And, in the case of Comparative Example 6 wherein the weight average molecular weight conditions of the first surface crosslinking agent and second surface crosslinking agent were not fulfilled, 0.9 AUL fall rate after anti-caking treatment was decreased compared to other Comparative Examples, but 0.9 AUL fall rate after anti-caking treatment was large compared to Examples, and deteriorated CRC property was exhibited.

And, in the case of Comparative Example 7 wherein PEG600 forming a covalent bond at a temperature range greater than 150° C. was used as a second surface crosslinking agent, 0.9 AUL fall rate after anti-caking treatment was large.

And, in the case of Comparative Example 8 wherein aluminum sulfate was used as a second surface crosslinking agent, 0.9 AUL fall rate was decreased compared to Comparative Example 1, but compared to Example 1 wherein different second surface crosslinking agent was used under the same conditions, sufficient surface crosslinking strength could not be secured, and thus, 0.9 AUL fall rate after anti-caking treatment was large.

The invention claimed is:

1. A method for preparing superabsorbent polymer comprising:

conducting crosslinking polymerization of water soluble ethylenically unsaturated monomers having acid groups of which at least a part are neutralized, in the presence of a polymerization initiator and an internal crosslinking agent, to form hydrogel polymer comprising a crosslinked polymer of water soluble ethylenically unsaturated monomers;

drying, grinding and classifying the hydrogel polymer to obtain base resin powder;

conducting first surface crosslinking of the base resin powder while raising to a first temperature, in the presence of a first surface crosslinking agent to form a first surface crosslinked base resin powder; and conducting second surface crosslinking of the first surface crosslinked base resin powder at a second temperature, in the presence of a second surface crosslinking agent, to form superabsorbent polymer particles, wherein the first temperature is 180° C. or more, and the second temperature is 120° C. to 150° C., and the second surface crosslinking agent comprises an epoxy-based compound having larger weight average molecular weight than that of the first surface crosslinking agent, and capable of forming a covalent bond at the second temperature.

2. The method for preparing superabsorbent polymer according to claim 1, wherein a ratio of the weight average molecular weight of the second surface crosslinking agent to the weight average molecular weight of the first surface crosslinking agent is 1.8 or more.

3. The method for preparing superabsorbent polymer according to claim 1, wherein the first surface crosslinking agent comprises one or more compounds selected from polyhydric alcohol or alkylene carbonate.

4. The method for preparing superabsorbent polymer according to claim 1, wherein the first surface crosslinking agent comprises one or more selected from ethylene carbonate, propylene carbonate, ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol or glycerol.

5. The method for preparing superabsorbent polymer according to claim 1, wherein during the first surface crosslinking, one or more selected from inorganic filler and organic acid are further introduced.

6. The method for preparing superabsorbent polymer according to claim 5, wherein the inorganic filler comprises one or more selected from silica, fumed silica, clay, alumina, silica-alumina composite, titania, zinc oxide, or silicate.

7. The method for preparing superabsorbent polymer according to claim 5, wherein the organic acid comprises one or more selected from oxalic acid, acetic acid, lactic acid, citric acid, fumaric acid, tartaric acid, or maleic acid.

8. The method for preparing superabsorbent polymer according to claim 1, wherein the second surface crosslinking agent comprises an epoxy-based compound comprising two or more epoxide functional groups in the molecule, and having a boiling point under atmospheric pressure of 150° C. or more.

9. The method for preparing superabsorbent polymer according to claim 1, wherein the second surface crosslinking agent comprises one or more epoxy-based compounds selected from the group consisting of ethyleneglycol diglycidyl ether, 1,4-butanediol diglycidyl ether, propyleneglycol diglycidyl ether, hexanediol diglycidyl ether, diethyleneglycol diglycidyl ether, triethyleneglycol diglycidyl ether, dipropyleneglycol diglycidyl ether, tripropyleneglycol diglycidyl ether, glycerol triglycidyl ether, polypropyleneglycol diglycidyl ether, and polyethyleneglycol diglycidyl ether.

10. The method for preparing superabsorbent polymer according to claim 1, wherein during the second surface crosslinking, polycarboxylic acid or a salt thereof is further introduced.

11. The method for preparing superabsorbent polymer according to claim 1, wherein the first surface crosslinking comprises a first maintenance process of maintaining the first temperature, after raising to the first temperature, and the first maintenance process is conducted for a time of 50% or more of a total time during which the first surface crosslinking is conducted.

12. The method for preparing superabsorbent polymer according to claim 1, wherein the first temperature is 180 to 200° C.

13. The method for preparing superabsorbent polymer according to claim 1, wherein during the second surface crosslinking, the second surface crosslinking agent is introduced when a temperature of the first surface crosslinked base resin powder is 140 to 150° C., and the second surface crosslinking is conducted while cooling to a temperature of 120 to 130° C. at a cooling speed of −1.5 to −2.0° C./min.

* * * * *